UNITED STATES PATENT OFFICE.

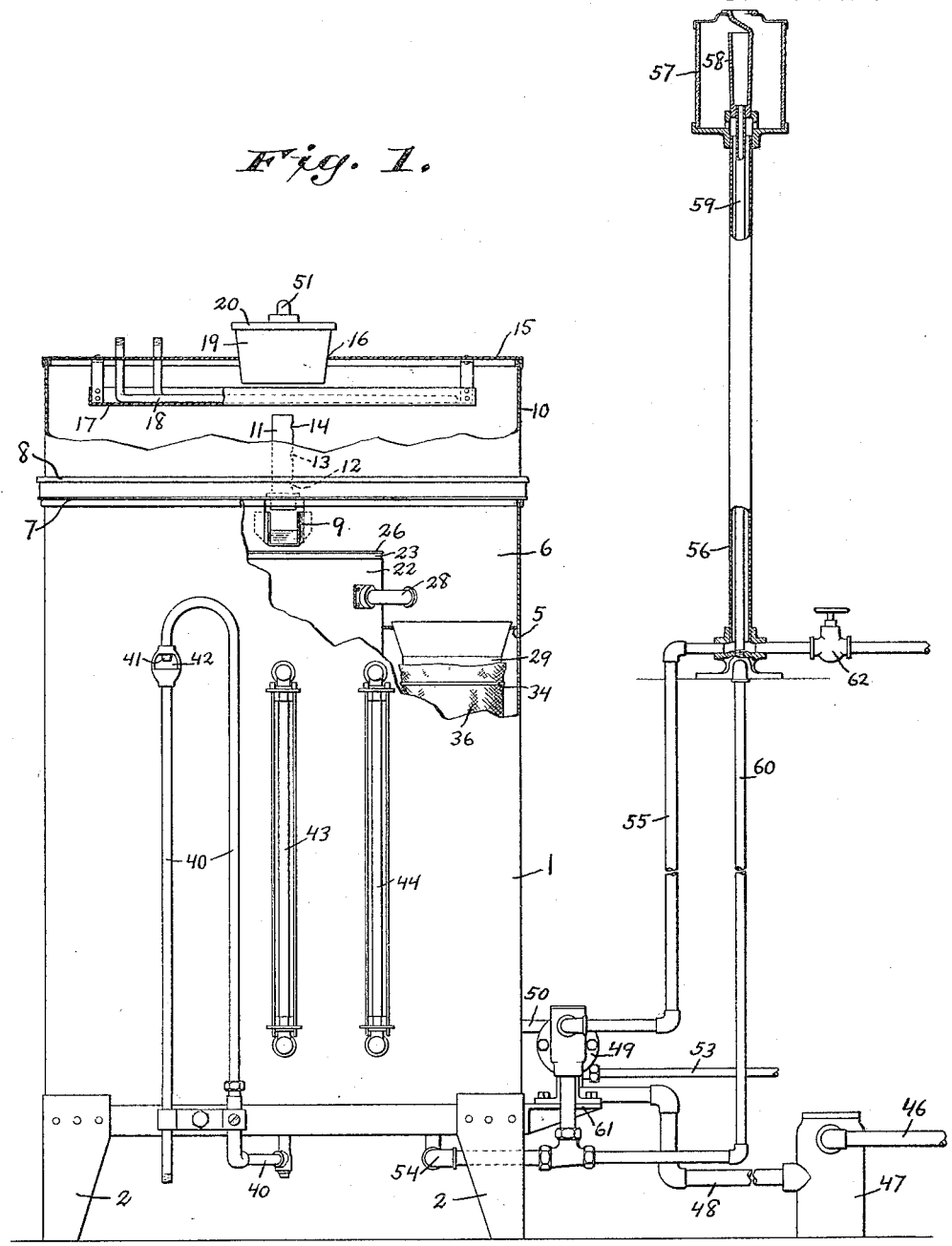

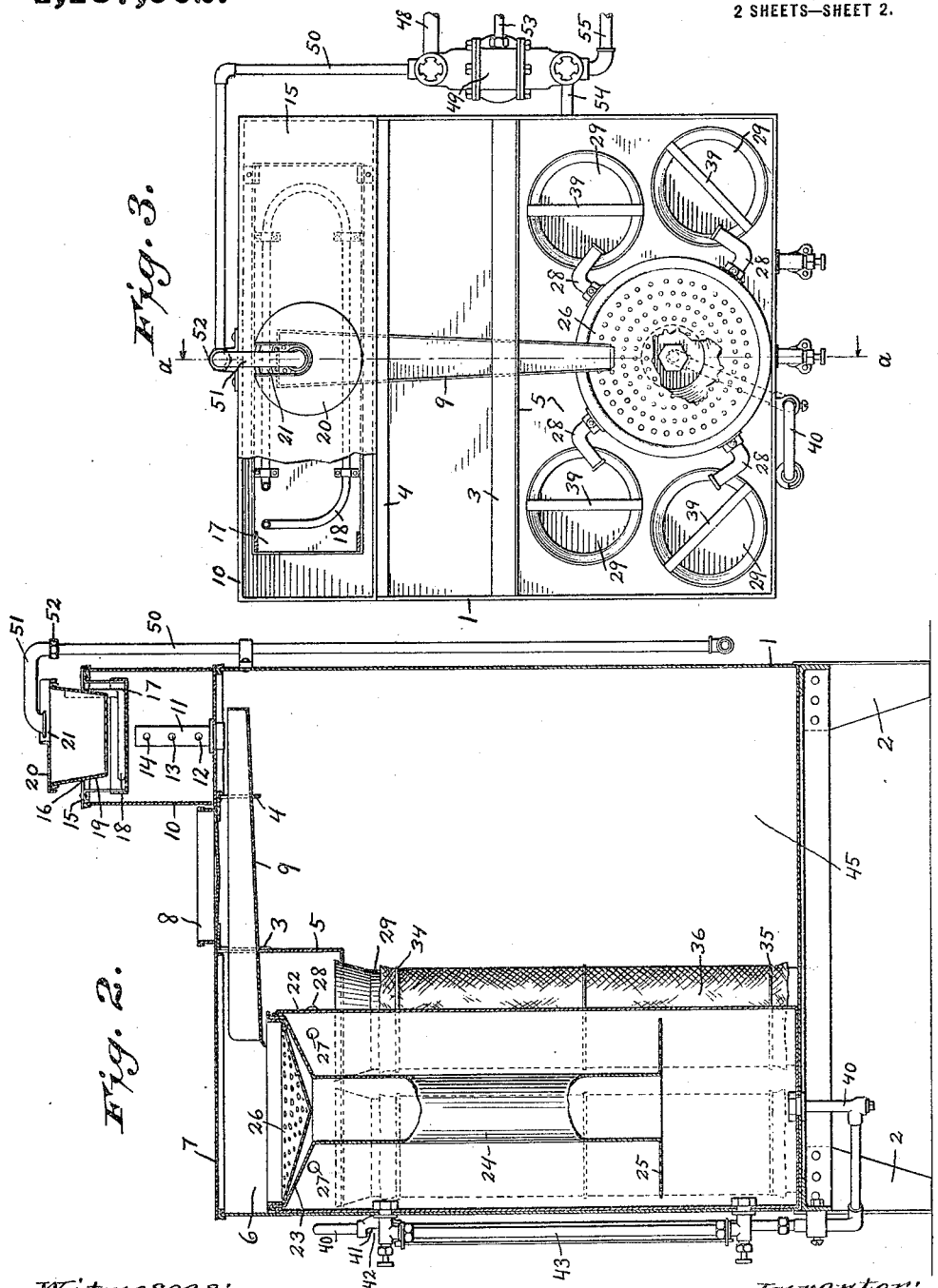

WILBER E. RICHARDSON, OF MILWAUKEE, WISCONSIN; WISCONSIN TRUST COMPANY, OF MILWAUKEE, WISCONSIN, A CORPORATION OF WISCONSIN, ADMINISTRATOR OF SAID RICHARDSON, DECEASED.

FILTER.

1,137,902.   Specification of Letters Patent.   Patented May 4, 1915.

Application filed March 11, 1911.  Serial No. 613,761.

*To all whom it may concern:*

Be it known that I, WILBER E. RICHARDSON, a citizen of the United States, residing at Milwaukee, in the county of Milwaukee and State of Wisconsin, have invented certain new and useful Improvements in Filters, of which the following is a specification, reference being had to the accompanying drawing, forming a part thereof.

This invention relates to filters for lubricating oils and similar substances and the objects of the invention are to improve the construction and efficiency of such filters so as to handle the oil to better advantage and more economically than has heretofore been done.

Referring to the drawings which accompany this specification and form a part thereof, on which drawings the same reference characters are used to designate the same elements wherever they may appear in each of the several views, and which drawings illustrate an embodiment of this invention, Figure 1 is a front elevation of a filter and some of the associated parts, parts being broken away and parts being shown in section for clearness of illustration; Fig. 2 is a vertical, longitudinal section of the filter taken on the line a—a of Fig. 3; and Fig. 3 is a plan view of the filter, with the cover and oil can tray removed, parts being broken away.

Referring specifically to the drawings, the reference numeral 1 designates a tank which is preferably supported on legs 2. Supports 3 and 4 extend across the upper end of the tank 1 and are preferably of angle-iron form in section, as shown by the drawings. A partition 5 is secured in the tank 1 and to support 3 to form a chamber 6 within the tank and separated from the interior of the tank except as hereinafter described. A removable cover 7 closes the top of chamber 6. An oil can tray 8 is supported upon the top of tank 1 and supports 3 and 4 and has its bottom inclined downwardly in all directions toward its center, at which point apertures are provided to allow the drip to fall into the trough 9 which is supported in apertures in partition 5 and the depending parts of supports 3 and 4, so as to be removable therefrom for cleaning. An oil receptacle 10 is removably seated upon the top of tank 1 and support 4 and this oil receptacle 10 has a pipe 11 secured to its bottom so as to stand in an upright position. The pipe 11 is open at both ends and has a series of openings 12, 13 and 14 to regulate the flow of oil from oil receptacle 10 to trough 9 and the filtering cans. Trough 9 extends under pipe 11, as shown by the drawings. The openings 12, 13 and 14 provide for the gradual flow of oil from the oil receptacle 10 out through pipe 11. If the oil level in the oil receptacle 10 be below the opening 13 the oil will flow out gradually through opening 12. If the oil level be above the openings 13 and 14 the oil will gradually flow out through all three openings 12, 13 and 14. If the oil level should rise above the upper end of pipe 11 the oil will flow out through the top of the pipe as well as through the three openings.

While the pipe 11 is shown and described as provided with three openings, it should be understood that it may be provided with either a greater or lesser number of openings without changing the principle of operation of the filter. The oil is filtered through cloth bags, in the manner to be hereinafter described, and it is desirable to have it flow into the bags gradually so as to have plenty of time to filter therethrough. When additional oil is added to the supply in a lubricating system it is most convenient to add it by pouring it into oil receptacle 10, say by the pailful. Sometimes it will be desirable to filter oil taken from some other place than the system or apparatus being lubricated. Such oil can be thrown by the pailful into the oil receptacle 10 without rushing immediately into the filter bags. The more slowly the oil filters through the filter bags the less chance there is for dirt and foreign matter to be forced through the bags. The open upper end of pipe 11 acts as an overflow or safety vent to let the oil out quickly so that the oil receptacle 10 will not be filled so full as to run over.

bore for that purpose. The valves are provided with reduced parts of the bores stopping within a short distance of the lower horizontal bore.

The oil receptacle 10 is provided with a removable cover 15 in which is an aperture 16 and suspended from the bottom of said cover is a sediment tray 17 in which is a heating coil 18 through which a heating medium such as steam, can be circulated. A strainer 19 is removably seated in the aperture 16 of cover 15, and is provided with a removable cover 20, which has an aperture 21 to permit oil to flow into the strainer.

The reference numeral 22 designates a separator which, in the form shown, is a cylindrical can extending from the bottom of tank 1 up through an aperture in the bottom of partition 5 into chamber 6. The funnel 23 rests upon the top of the separator 22 so as to be removable therefrom and the funnel is extended down into the separator by the tube 24 on the exterior of which is the perforated baffle plate 25, the external diameter of which nearly equals the interior diameter of the separator 22, as is clearly shown by the drawings. A removable strainer 26 is seated in the top of the funnel 23, and into this strainer 26 the oil flows from the trough 9. Outlets 27 are provided near the top of the separator 22 and below the funnel 23, a separate outlet preferably being provided for each filtering can. The drawings show four outlets and four filtering cans, but of course, more or less than four may be used. Each outlet has a nozzle 28, which may be turned down so as to direct the oil into its proper filtering can, or may be turned up to stop the flow of oil therethrough and to be out of the way of the filtering can so that the filtering can may be removed for cleaning or for any other reason. Fig. 3 of the drawings clearly shows the horizontally rotatable parts of the elbow nozzles 28 extending in the direction of the filtering cans, but along the sides thereof, so that the other parts of the elbows may be turned down over the filtering cans or may be turned up out of line therewith.

The bottom of the partition 5 is provided with apertures to receive the filtering cans 29. The filtering cans 29 are preferably made cylindrical, as shown, with flaring tops to make tight fits in the apertures in the bottom of partition 5. The filtering cans 29 are closed at their bottoms and have apertures (not shown) in their sides and are surrounded by bags or open ended tubes of fabric secured to the filtering cans by fastening means such as strings or cords 34 and 35.

The bags are designated by the numeral 36.

The filtering cans are provided with handles 39 by means of which they can be readily removed and replaced. A water separating or overflow pipe 40 communicates with the interior of the separator 22, extends vertically about to the top of the separator 22 and is then curved over and extended downwardly to automatically run off the water from the oil. This overflow pipe is provided with a nozzle 41 which is visible through a sight opening 42 so that when the water overflows it can be seen flowing from nozzle 41. The overflow pipe 40 may be connected with a sewer, or lead to any suitable place of discharge. The curve at the top of pipe 40 is slightly lower than the outlets 27 from separator 22. Some water is always kept in separator 22, and as the water is heavier than the oil, the oil rests upon the top of the water and the hydrostatic head of the combined columns of water and oil when the water level in the separator 22 is not higher than a certain position, is insufficient to raise the water column in overflow pipe 40 sufficiently high so that the water will pass over the curve at the top of said pipe and flow out through the nozzle 41. If now the water level in the separator 22 rises, the increased pressure due to the greater proportion of water in the water and oil column in separator 22, is sufficient to raise the water level in pipe 40 to the curve at the top of said pipe, so that the water will be drained off from below the oil in the separator 22 until the normal water level is reestablished therein.

The reference numeral 43 designates a glass sight gage, which is in communication at both its upper and lower ends with the interior of the separator 22, so that the height of the water in separator 22 may be readily observed, and the reference numeral 44 designates a similar sight gage which is in communication in like manner with the interior of tank 1 so as to show the height of the clean oil in the clean oil chamber 45 in tank 1. The clean oil chamber 45 is the whole interior of tank 1 outside of the separator 22 and the filtering cans 29 with their cloth bags 36.

The filter heretofore described is illustrated as forming the filtering unit of a lubricating system.

The reference numeral 46 designates a common return pipe for the oil from the apparatus or mechanism to be lubricated. The return pipe 46 conducts the oil into an oil well 47, from which the oil is pumped through pipe 48 by pump 49, into pipe 50, which extends upwardly and is provided at its upper end with a swinging elbow 51, to discharge the oil into strainer 19. The elbow 51 swings on the coupling 52 so that it may be swung over strainer 19 into the position shown by the drawings, or swung away from over strainer 19 so that strainer 19 may be lifted out of the aperture 16 in the cover 15 of the oil receptacle 10. The pump 49 is preferably a double acting pump, that is to say, a piston pump, each end of the piston of which acts as a separate pump, and the piston is reciprocated by the oscillatable shaft 53. The oil is pumped from the clean oil chamber 45 of the filter through pipe 54, and is delivered by the pump through pipe 55 to the apparatus or mechanism to be lubricated. A stand pipe 56 is in communication with pipe 55, so as to maintain a hydraulic head of oil which will provide a steady flow of oil to the apparatus or mechanism to be lubricated without regard to the pulsations which would otherwise be produced by the pump. On the top of stand pipe 56 is placed a glass cylinder 57 to show the height of the oil in the stand pipe and cylinder, and an overflow pipe 58 opens near the top of the said glass cylinder and is in open communication with pipes 59 and 60, through which any oil which overflows is returned to pipe 54, and the clean oil reservoir 45. The shaft 53 of the pump 49 may be oscillated in any suitable manner, but preferably it is oscillated by being directly connected with a movable part of the apparatus or mechanism to be lubricated. In order that the filter may be as nearly as possible a single unit, the pump 49 is preferably supported upon a bracket 61, secured to the tank 1.

The operation of the filter and apparatus is as follows: The clean oil is pumped from the clean oil chamber 45 through pipes 54 and 55 to the mechanism or apparatus to be lubricated. A valve 62 is shown by Fig. 1 of the drawings, to indicate generally means for regulating the amount of oil pumped through pipe 55, and the stand pipe 56 is in communication with pipe 55 between valve 62 and pump 49. By adjusting valve 62, a substantially definite level of oil can be maintained in the glass cylinder 57 in a manner which will be readily understood. The oil which returns through the common return pipe 46, flows into oil well 47 and is pumped by the pump 49 through pipes 48 and 50 into strainer 19, where any particles of scale or other material are retained. The oil drops from strainer 19 into the sediment or heating tray 17, where it is heated because of the presence of the heating medium in heating coil 18. The heating of the oil decreases its viscosity, or in other words, renders the oil more fluid, so that the particles of dirt, scale, &c., more readily sink to the bottom of the oil and such foreign matter accumulates as sediment in the tray 17, from which it can be removed from time to time. The oil flows over the top edges of tray 17, and falls into the oil receptacle 10, whence it passes through the pipe 11, as hereinbefore stated, into the trough 9, which delivers it onto strainer 26 in the top of funnel 23. The oil then passes down through tube 24 and floats up through the water in the lower part of separator 22, being finely divided as it passes up through the perforations of baffle plate 25 and around the edge thereof, to finally collect on top of the water and pass off through the outlets 27 into the filtering cans 29. It will be noted that up to this point the oil has had an opportunity to deposit sediment in three places, viz, tray 17, oil receptacle 10 and separator 22. The oil passes from the outlets 27 through the nozzles 28 into the filtering cans 29, which cans as hereinbefore stated, are provided with closed bottoms. The oil passes out through the holes (not shown) in the sides of the filtering cans 29 and filters through the bags into the clean oil chamber 45.

What is claimed is:

1. The combination in a filter of a tank, a separator and a filtering can and a rotatable bent nozzle projecting from the separator in a direction alongside the filtering can so that when the nozzle is rotated in one direction its end extends over the filtering can, and when rotated in the opposite direction or upwardly its end is not above the filtering can whereby the flow of oil through the nozzle is stopped and the filtering can may be removed from the tank.

2. In a filter, the combination of a tank provided with a partition therein to form a chamber separate from the rest of the interior of the tank, a separator closed at its bottom and open at its top extending from said chamber into the interior of said tank and adapted to contain both oil and water, a filtering can open at its top also extending from said chamber into the interior of said tank, and a rotatable bent nozzle projecting from the separator in a direction alongside the filtering can so that when the nozzle is rotated in one direction its end extends over the filtering can, and when rotated in the opposite direction or upwardly its end does not project over the filtering can.

3. In a filter, the combination of a tank provided with a partition therein to form a chamber separate from the rest of the interior of the tank, a separator closed at its bottom and open at its top extending from said chamber into the interior of said tank and adapted to contain both oil and water, a plurality of filtering cans open at their tops arranged around said separator and also extending from said chamber into the interior of said tank, a plurality of rotatable bent nozzles projecting from the separator in directions alongside the filtering cans so that when the nozzles are rotated in one direction their ends will extend over the filtering cans, and when rotated in the opposite direction or upwardly their ends will not project over the filtering cans, and means for conducting oil to said separator.

In witness whereof I hereto affix my signature in presence of two witnesses.

WILBER E. RICHARDSON.

Witnesses:
JOHN H. HURLEY,
FRANK E. DENNETT.